No. 861,544. PATENTED JULY 30, 1907.
M. SINOVCIC.
WAGON STARTER.
APPLICATION FILED APR. 11, 1907.

2 SHEETS—SHEET 2.

Marin Sinovcic
Inventor

Witnesses
C. E. Smith
Geo. E. Tew

By
Attorney

UNITED STATES PATENT OFFICE.

MARIN SINOVCIC, OF CHICAGO, ILLINOIS.

WAGON-STARTER.

No. 861,544.

Specification of Letters Patent.

Patented July 30, 1907.

Application filed April 11, 1907. Serial No. 367,615.

*To all whom it may concern:*

Be it known that I, MARIN SINOVCIC, a subject of the Emperor of Austria, residing at Chicago, in the county of Cook and State of Illinois, have invented certain new and useful Improvements in Wagon-Starters, of which the following is a specification.

This invention is a wagon starter or gear adapted particularly for starting a wagon up a hill or with a heavy load, or for pulling a wheel out of a hole or rut in a road.
The object of the invention is to provide a convenient device for the purpose which may be applied to existing trucks, or heavy draft wagons for the purpose stated.

The invention is illustrated in the accompanying drawings, in which

Figure 1:
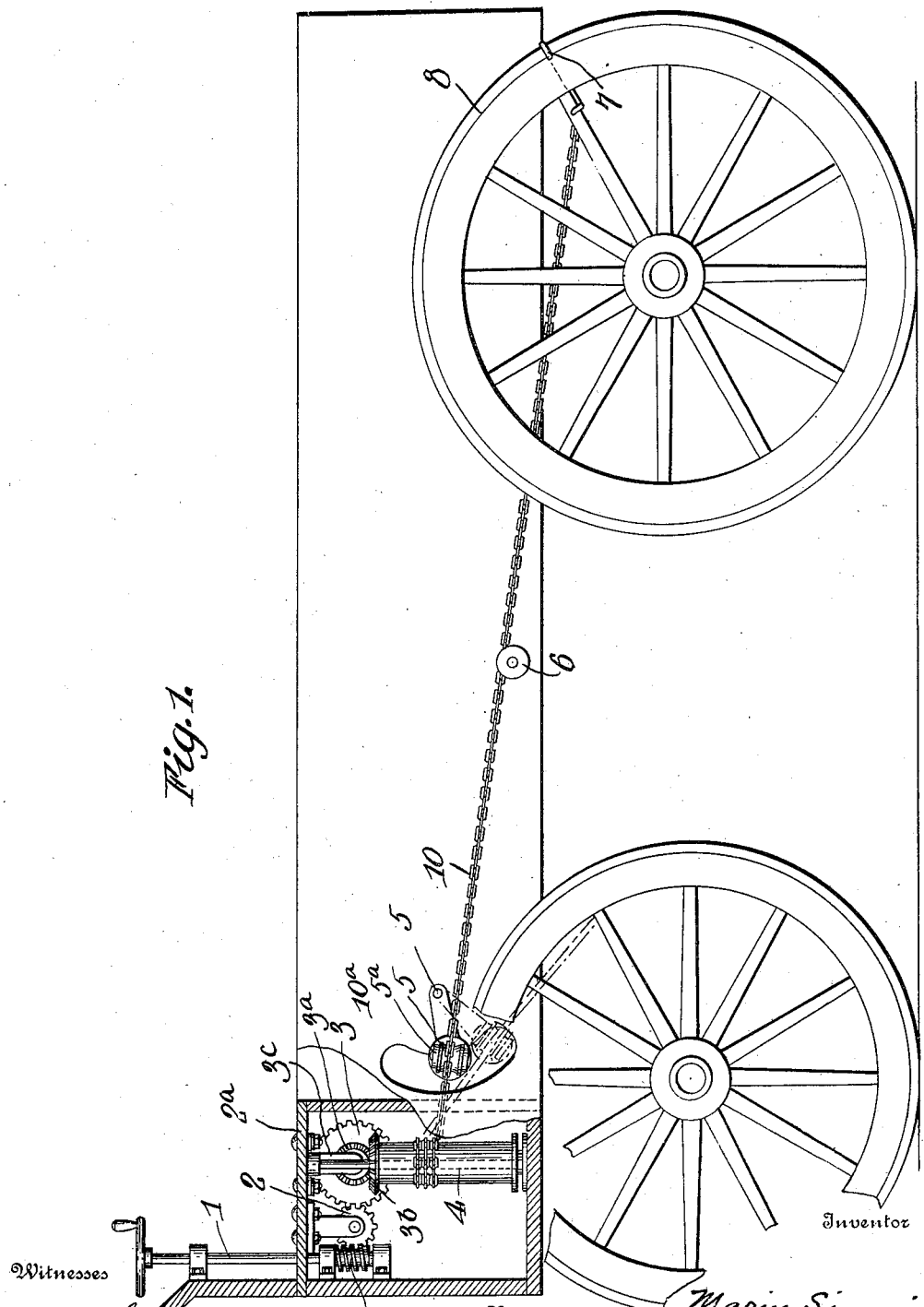
Figure 2:
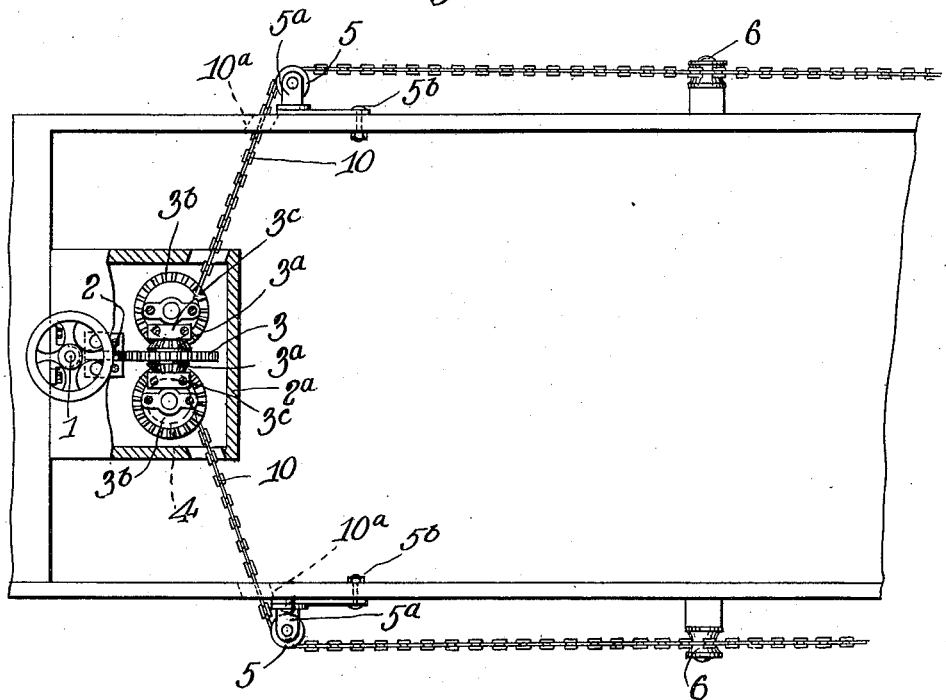
Figure 3:
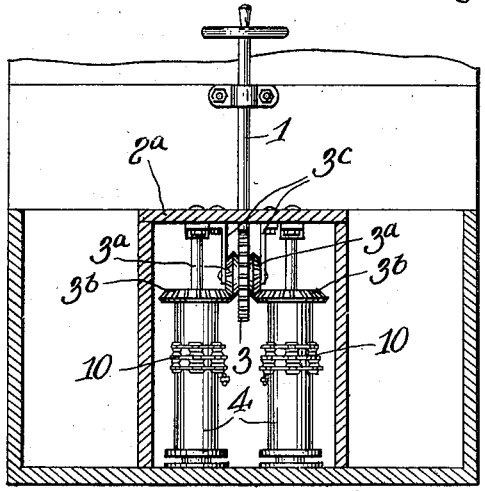

Figure 1 is a side elevation of a wagon, partly broken away, provided with the invention. Fig. 2 is a plan view of the winding gear. Fig. 3 is an end elevation of the same.

Referring specifically to the drawings, 1 indicates a vertical shaft carried in bearings or under straps which may conveniently be attached to the dashboard of the wagon, and said shaft is provided at the top with a hand wheel, and at the bottom with a worm $1^a$ which meshes with a pinion 2 carried in hangers depending from a frame $2^a$ built or made in the wagon box. Said pinion meshes with a larger gear 3 having twin bevel gears $3^a$ on its sides which mesh with corresponding bevel gears $3^b$ on the top end of the drums 4. The wheel 3 is supported by hangers $3^c$ depending from the frame, and the shafts of the drums 4 are mounted in bearings in the top piece of the frame and in the bottom of the wagon box.

The drums 4 carry chains 10 which run through openings $10^a$ in the sides of the wagon box and over guide pulleys 5 and 6 on the outside of the box, and are connected by hooks 7 to the hind wheels 8. Or the chains may be connected to the front wheels as indicated in dotted lines in Fig. 1, the swiveling guide pulleys 5 being mounted in frames $5^a$ which are pivoted to the sides of the wagon box by bolts $5^b$, thereby allowing said pulleys to swing up or down to give proper direction to the chains. The casing or frame $2^a$ is preferably made closed to protect the gearing from the load in the wagon.

The operation of the apparatus is evident from the foregoing description, and it may be utilized when starting up a hill or with a heavy load, or especially to start a wheel out of a hole. Either one or both chains can be used, and applied to either one or two wheels.

I claim:

1. The combination with a wagon having openings in the sides of the body, of frames pivoted to said sides beside said openings, swiveling pulleys mounted on said frames, and a winding gear and drum having cables extending through said holes and over the pulleys.

2. The combination with a wagon having openings in the side of the body, and swiveling guide pulleys beside said openings, of a winding gear and drum mounted on the wagon body at the front thereof and having cables extending through said holes and over the pulleys and adapted to be connected to the wheels.

In testimony whereof I affix my signature, in presence of two witnesses.

MARIN SINOVCIC.

Witnesses:
  H. G. BATCHELOR,
  JOHN M. STRMIC.